United States Patent Office 3,262,345
Patented July 26, 1966

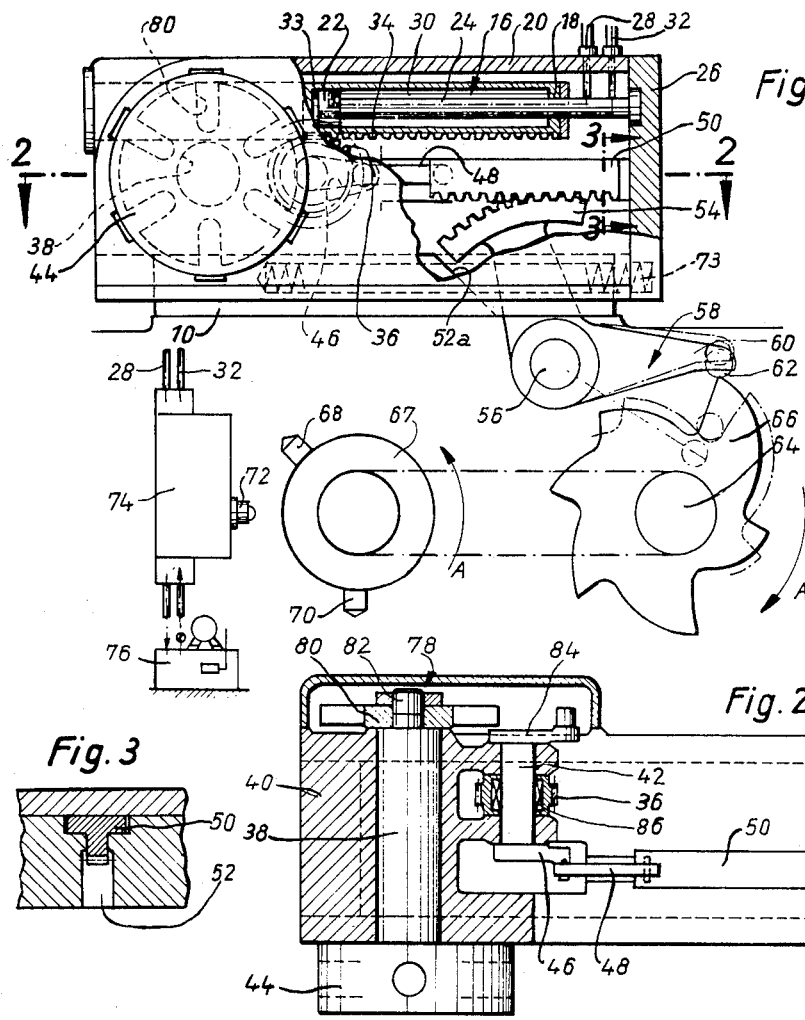

3,262,345
TOOL CARRIAGE DRIVE
Karl Spohn, Esslingen-ober-Esslingen, and Gerhard Foell, Esslingen (Neckar), Germany, assignors to Index-Werke KG Hahn & Tessky, Esslingen (Neckar), Germany
Filed Jan. 27, 1965, Ser. No. 428,400
Claims priority, application Germany, Feb. 7, 1964, J 25,204; Feb. 20, 1963, J 23,204
13 Claims. (Cl. 82—21)

The present application is a continuation-in-part application of our copending application Serial No. 345,032, filed February 14, 1964, and entitled "Carriage Speed Control Apparatus."

Our copending application discloses an automatic lathe whose tool carriage is reciprocated by a hydraulic motor in a rapid motion to and from a working position by the rotation of a pinion connected by a crank lever with a a link which is operated by the cam follower of a drive cam. When the crank and the link are aligned, the drive cam drives the carriage through the link and crank in a working stroke following the rapid advance of the carriage with the tool to a working position located in the region of the workpiece. Rotation of the pinion causes then rapid retraction of the carriage with the tool, and a spring is provided for fully retracting the carriage.

It is one object of the present invention to adapt this construction to an automatic turret lathe for effecting indexing of the turret during the rapid carriage movement.

Another object of the present invention is to move the carriage rapidly in reciprocating motion out of the working position and back to the same, and to cause indexing of the turret to the next following position during the rapid reciprocating motion of the carriage.

Another object of the invention is to selectively effect indexing of the turret in one direction between sucessive working positions, or reciprocating indexing movement of the turret between two working positions.

Another object of the invention is to effect a rapid retraction and advance of the carriage by rapidly rotating a member which is connected to the turret for rotating movement.

With these objects in view, the present invention relates to an automatic machine tool, such as a lathe. According to one embodiment of the invention, a carriage is mounted on the machine bed for reciprocating movement and supports a tool holder or turret for indexing movement between a plurality of working positions so that the tool holder reciprocates with the carriage toward and away from a workpiece.

The apparatus of the invention comprises first drive means, such as a rotary drive cam and a cam follower; first and second interconnected connecting means respectively connected to the cam follower and to the carriage and having a connecting condition connecting the cam follower with the carriage so that the same is driven at a working speed. Second hydraulic drive means, preferably including a rack bar are connected to a rotary member, preferably a pinion meshing with the rack bar, and cause the second connecting means to move the tool holder away and toward the workpiece at a higher speed than the working speed.

The rotary member, and more particularly the pinion, is connected with the tool holder for indexing the same between its working position during movement of the second connecting means, which preferably includes in addition to the pinion, a crank rotating with the pinion, and a connecting rod or link connecting the crank with the cam follower. When the connecting rod and the crank are in an aligned position corresponding to the connecting condition of the first and second connecting means, the carriage with the tool holder is moved in a short working stroke at a smaller working speed by the cam follower and cam.

Control means are operatively connected with the motor which drives the pinion for actuating the same in timed relation with the positions of the drive cam so that the same moves the carriage in a working stroke while the crank and the connecting rod are aligned in the connecting condition.

In the preferred embodiment of the invention, the pinion is mounted on a shaft which drives the indexing tool holder through a Geneva drive. Preferably, a clutch connects the pinion with the shaft, and such clutch is advantageously a one-way clutch, or a clutch selectively operable to connect the pinion with the shaft during rotation in one or the other direction of rotation, or alternately in opposite directions of rotations. In the last-mentioned condition of the clutch, the indexing tool holder is not rotated, but is angularly reciprocated for alternately rendering two tools effective.

Due to the fact that in the machine of the present invention, the tool holder or turret is driven from the shaft of the pinion, it is not necessary to provide an independent drive for rotating the tool holder whereby the cost of the apparatus is reduced.

The reciprocation of the carriage, and the step-wise turning of the turret must be carried out in a specific timed relation so that the turret with the tool is indexed only after the carriage has been rapidly retracted to a position in which the tool can be shifted without obstruction by the workpiece.

This is advantageously accomplished by a Geneva drive whose slotted star wheel is secured to the turret for rotation, and whose drive member has a single projection. The angular position of the drive member in relation to the shaft on which the pinion is mounted must be selected so that the angular displacement of the drive member before engagement with the slotted star wheel is sufficiently great to permit spacing of the shifted tools a safe distance from the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side elevation, partially in section, and illustrating the carriage of an automatic lathe in accordance with one embodiment of the invention;

FIG. 2 is a horizontal sectional view of the embodiment of FIG. 1 taken on line 2—2 in FIG. 1;

FIG. 3 is a fragmentary cross section taken on line 3—3 in FIG. 1;

FIG. 4 illustrates a tool holder according to a modified embodiment of the invention in a first operational position; and FIG. 5 illustrates a tool holder of FIG. 4 in another operational position.

Referring now to the drawings, and more particularly to FIGS. 1 to 3, a tool carriage 26 is mounted on a machine bed 10 for reciprocating movement between a working position illustrated in FIG. 1 and a retracted position displaced to the right as viewed in FIG. 1. A shaft 38 is mounted in a bearing of carriage 26 and carries at one end a tool holder or turret 44 on which a plurality of radially projecting tools, not shown in FIGS. 1 and 2, are mounted. A Geneva wheel 80 is secured to the other end of shaft 38, and has a number of slots corresponding to the number of tools, for example six slots.

A shaft 42 is mounted for turning movement in another bearing of carriage 26, and carries at one end a drive member 84 having a single projection cooperating with the slots of the Geneva wheel 80 so that a complete rotation of shaft 42 with drive member 84 causes angular displacement of shaft 38 with tool holder 44 for an angle corresponding to the angular spacing of the tools held in tool holder 44.

A pinion 36 is mounted on shaft 42 for free rotary movement, and is connected to the same by a clutch 86 which is a one-way clutch in the embodiment of FIGS. 1 to 3.

A connecting rod 48 has one end pivotally connected to the free end of crank 46, and the other end pivotally connected to a rack bar 50 of T-shaped cross section which is guided in a corresponding slot within carriage 26, as best seen in FIG. 3. The teeth of rack bar 50 project into a slot 52 in which a toothed segment 54 secured to one arm of a bell crank lever 58 is located. Bell crank lever 58 is mounted on a stationary shaft 56 and has a cam follower arm 60 with a follower roller 62 cooperating with the stepped peripheral cam track of a rotary drive cam 66 which is secured to a drive shaft 64.

An elongated coil spring 73 is mounted in a cavity of carriage 26 and has one end abutting the end plate of carriage 26, and the other end abutting a stationary abutment of machine bed 10 to urge carriage 26 to the right as viewed in FIG. 1 whereby cam follower means 58, 60, 62 is urged toward the cam track of cam 66 so that roller 62 tends to drop from the extremity of each cam lobe to the lowest point of the next following lobe when cam 66 is turned in the direction of the arrow A.

In the position illustrated in FIG. 1, one of the tools in tool holder 44 is in a working position and has just completed a working stroke during which the tool cuts into the workpiece. During such movement, the carriage was moved to the left as viewed in FIG. 1 by the action of drive cam 66 while follower roller 62 moved from the lowest point of the respective cam lobe to the highest point, as shown in FIG. 1. While roller 62 passes over the cam track of the respective lobe, cam follower means 58, 60 turns in counterclockwise direction, the toothed segment displaces rack bar 50 to the left, and such movement is transmitted to shaft 42 over the crank 46 and connecting rod 48 which is possible since crank 46 and connecting rod 48 are aligned at this moment and consequently capable of transmitting the force to shaft 42 and thereby to carriage 26.

When drive cam 66 turns beyond the illustrated position in the direction of the arrow A, as will be described hereinafter in greater detail, follower roller 62 drops to the lowest portion of the next following cam lobe since spring 73 urges carriage 26 to the right so that rack bar 50 moves to the right and turns cam follower means 58 in clockwise direction.

From the above description of the function of drive cam 66, it will become apparent that shaft 64, cam 66 and cam follower means 58, 60, 62 constitute a drive means for moving the carriage with the tool holder in a working stroke at an appropriate working speed determined by the shape of the respective cam lobe, different cam lobes being effective for moving different tools in working strokes.

It is necessary to retract the carriage and to index the tool holder 44 between two working strokes, since the indexing of the tool holder cannot be carried out in the region of the workpiece. In order to achieve an economic operation, the necessary reciprocating movement of carriage 26 must be carried out at a high speed.

Another drive means is provided for this purpose, and in the embodiment of FIG. 1, a hydraulic motor 16 is disposed in the housing portion 20 of carriage 26. A piston rod 24 is fixedly secured to the end plate of carriage 26 and has a piston portion 22 dividing the interior of a closed cylinder 18 into working chambers 33 and 30. Conduits 28 and 32 are mounted on housing 20 and connected to corresponding ducts in piston rod 24 which are connected with ducts in piston portion 22 respectively opening in chambers 30 and 33. A motor driven pump 76 is connected by conduits to a valve means 74 which is actuated by a depressible control member 72 operated by actuator lugs 68, 70 on a rotary actuator member 67. Actuator 67, 68, 70 is mounted on shaft 64, as schematically indicated by dash and dot lines, which may also be interpreted as the belt of a pulley and belt drive. Conduits 28 and 32 are connected to the valve means 74, and controlled by operation of control member 72 to be alternately connected to the outlet and inlet of pump 76. When valve means 74 is operated to supply pressure fluid to chamber 33 through conduit 32, the freely movable cylinder member 18 is urged to move to the left, as viewed in FIG. 1, whereas the next following actuation of control member 72 will cause pressure fluid to flow through conduit 28 into chamber 30 and to move cylinder member 18 back to the illustrated position. Cylinder member 18 is guided in a corresponding guideway in a solid portion at the left of housing 20, the lower portion of the guideway being open, similar to the construction shown in FIG. 3, to permit passage of a downwardly projecting rack portion 34 at the bottom face of cylinder member 18.

Rack bar portion 34 meshes with pinion 36 so that movement of cylinder member 18 to the left causes counterclockwise rotation of pinion 36 with crank 46 whereby rack bar 50 is urged to the left during the first half of a revolution of pinion 36, and urged to the right during the second half.

In the position of FIG. 1, the left end of gear segment 54 abuts a stop face 52a in the interior of slot 52, so that cam follower lever 58 cannot turn farther in counterclockwise direction. Turning movement in clockwise direction is blocked by the engagement of the cam lobe 66 by follower roller 62.

Drive cam 66 rotates at the speed depending on the operations required on the workpiece so that cam 66 performs a single revolution during the time required for the successive operations on one workpiece by the six tools mounted on tool holder 44. Assuming that the carriage has just completed a working stroke while follower roller 62 moved from the lowest point to the highest point of the respective cam lobe, it is now necessary to retract carriage 26, to index the tool holder to render the next tool operative, and to again advance the carriage to a position in which the next following tool is ready to perform a working stroke under the control of the next following cam lobe.

The actuator lug 68 operates control member 72 so that pressure fluid is admitted to chamber 33. Cylinder member 18 with rack portion 34 moves to the left while turning pinion 36 in counterclockwise direction. The forward stroke of cylinder member 18 and rack bar 34 is designed to cause pinion 36 to turn through 360°. One-way clutch 86 connects pinion 36 with shaft 42 during rotation in counterclockwise direction so that crank 46 is turned and exerts by connecting rod or bar 48 a pulling force on rack bar 50 tending to turn gear segment 54 in counterclockwise direction. However, since movement of gear segment 54 to the left is blocked by stop face 52a, rack bar 50 cannot move to the left, and a force is transmitted to shaft 42 which causes carriage 26 to move rapidly in a first stroke to the right until crank 46 has turned 180°.

During the second half of the revolution of pinion 36, pressure is exerted by crank 46 and connecting rod 48 on rack bar 50 which urges cam follower means 58 to turn in clockwise direction, but such turning movement is blocked by roller 62 abutting the cam track of cam 66. Consequently, a pressure is transmitted to shaft 42 which urges carriage 26 to move to the left so that the carriage and tool holder 44 perform a rapid reciprocating second stroke toward the workpiece.

The reciprocating movement of the carriage takes place at a very high speed, so that cam 66 turns only a small angle during the carriage movement, the angular displacement of cam 66 being sufficient to cause the extremity of the cam lobe to move away from roller 62 so that spring 73 causes carriage 26 to perform an additional movement to the right while follower roller 62 drops onto the lowest portion of the next following lobe of cam 66. This short distance in rearward direction corresponds to the working stroke in forward direction performed under the control of a cam lobe of cam 66.

During the reciprocating movement of carriage 26, the rotary movement of pinion 36 is transmitted by one-way clutch 86 to shaft 42 and drive member 84 so that the single projection of drive member 84 travels toward the Geneva wheel 80. At the proper moment, when the tools on tool holder 44 are sufficiently spaced from the workpiece, the drive member engages a slot of the Geneva wheels, and rotate the same one angular step together with tool holder 44 so that the next following tool is placed in the operative position. The actual indexing of the tool holder with the tools takes place when the tools are sufficiently far away from the workpiece to prevent any damage to the same.

When the carriage has completed its reciprocating motion, the respective next following tool is ready, while cam follower roller 62 is located on the lowest portion of the next following cam lobe. Since carriage 26 was moved a short distance to the right by spring 73 during the dropping of follower roller 62 to the next cam lobe, rack bar 50 moving to the right turns cam follower means 58 a corresponding angle so that gear segment 54 moves away from stop face 52.

Cam 66 continues its turning movement in the direction of the arrow A so that the cam track of the respective cam lobe causes turning of cam follower means 58 in counterclockwise direction. Since crank 46 and connecting rod 48 are again aligned after turning of pinion 36 for 360°, a connecting condition is established in which the force exerted by gear segment 54 on rack bar 50 is transmitted to shaft 42 which further transmits the force through its bearings to carriage 26 moving the same to the left while the operative tool in tool holder 44 performs an operation on the workpiece. Thereafter, the next following actuator lug 70 engages control member 72 so that the valve means 74 is operated to cause passage of pressure fluid through conduit 28 into chamber 30 whereby cylinder member 18 is returned to the right to the position shown in FIG. 1. Rack portion 34 turns pinion 36 during this return stroke, but the rotary movement is not transmitted to shaft 42, to the Geneva drive 80, 84 and crank 46, since the one-way clutch 86 does not engage during turning movement of pinion 36 in clockwise direction.

Clutch 86 is preferably selectively operable between several conditions. The clutch may be completely disengaged so that the tool holder 44 is not turned at all during a rapid reciprocating motion of the carriage, which may be desired for other operations. It is also possible to place the clutch in a condition in which the pinion is alternately connected with shaft 42 for rotation in opposite directions of rotation during successive revolutions of pinion 36.

The purpose of this operation is best understood with reference to FIGS. 4 and 5 which illustrate a tool holder 44 provided with two tools only which are to be alternately used on a workpiece. After the first tool has performed its operation, the tool holder 44 is indexed, as explained above, to a position in which the second tool is operative and located opposite the workpiece, as shown in FIG. 5. After the second tool has completed its operation, the tool holder 44 is not further rotated in the same direction, but turned one step in the opposite direction, rendering the first tool again operative on a new workpiece.

If a fixed coupling is provided between pinion 36 and shaft 42, shaft 42 is rotated and tool holder 44 is indexed during the return movement of cylinder member 18 to the right as viewed in FIG. 1.

From the above description of the construction and operation of a preferred embodiment, it will become apparent that drive cam 66, shaft 64, and cam follower means 58 are first mechanical drive means for causing a working stroke, and that hydraulic motor 16, 18 with rack portion 34 is a second hydraulic drive means for causing rapid reciprocation of the carriage. First connecting means 54, 50, 48 are driven by the first drive means, and second connecting means 36, 42, 46 are driven by the second drive means. The first and second connecting means are interconnected by a pivot pin between crank 46 and connecting rod 48 and have a connecting condition in which crank 46 is aligned with connecting rod 48 and permits the first drive means to drive the carriage in a working stroke.

It will be understood that each of the elements described above, or two or more together, may also find a useful application in other types of automatic machine tools differing from the types described above.

While the invention has been illustrated and described as embodied in an apparatus for angularly shifting the tool holder of an automatic lathe during the rapid retraction and advance of the tool carriage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means; first and second interconnected connecting means respectively connected to said first drive means and to said carriage means, said first and second connecting means being movable relative to each other and having a connecting condition connecting said first drive means with said carriage means so that said first drive means drives said carriage means at a working speed through said first and second connecting means in said connecting conditions, said second connecting means including a rotary member, and selectively operable clutch means for connecting said rotary member with said tool holder for rotation in at least one direction for indexing the same between said working positions; and second drive means including a hydraulic motor for rotating said rotary member, for moving said second connecting means at such a speed that said second connecting means reciprocates said carriage means toward and away from the workpiece at a higher speed than said working speed, and for placing said first and second connecting means in said connecting condition, said rotary member indexing said tool holder from each working position to the next following working position during a reciprocating movement of said carriage means.

2. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means; first and second interconnected connecting means respectively connected to said first drive means and to said carriage means, said first and second connecting means being movable relative to each other and having a connecting condition connecting said first drive means with said carriage means so that said first drive means drives said carriage at a working speed through said first and second connecting means in said connecting condition, said second connecting means including a rotary member, and selectively operable clutch means for connecting said rotary member with said tool holder for rotation in at least one direction for indexing the same between said working positions; second drive means including a hydraulic motor for rotating said rotary member, for moving said second connecting means at such a speed that said second connecting means reciprocates said carriage means toward and away from the workpiece at a higher speed than said working speed, and for placing said first and second connecting means in said connecting condition, said rotary member indexing said tool holder from each working position to the next following working position during a reciprocating movement of said carriage means; and control means driven by said first drive means and operatively connected with said second drive means for actuating the same in timed relation with the operation of said first drive means so that said first drive means operates said carriage means in said connecting condition of said first and second connecting means.

3. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means including a rotary cam, and cam follower means operated by said cam; first and second interconnected connecting means respectively connected to said cam follower means and to said carriage means, said first and second connecting means being movable relative to each other and having a connecting condition connecting said first drive means with said carriage means so that said first drive means drives said carriage means at a working speed through said first and second connecting means in said connecting condition, said second connecting means including a rotary member, and selectively operable clutch means for connecting said rotary member with said tool holder for rotation in at least one direction for indexing the same between said working positions; and second drive means including a hydraulic motor for rotating said rotary member, for moving said second connecting means at such a speed that said second connecting means reciprocates said carriage means toward and away from the workpiece at a higher speed than said working speed, and for placing said first and second connecting means in said connecting condition, said second drive means rotating said rotary member to index said tool holder from each working position to the next following working position during a reciprocating movement of said carriage means.

4. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means; first and second interconnected connecting means respectively connected to said first drive means and to said carriage means, each of said first and second connecting means including a bar, said bars being pivotally connected and angularly movable relative to each other and having an aligned connecting condition connecting said first drive means with said carriage means so that said first drive means drives said carriage means at a working speed through said first and second connecting means in said connecting condition, said second connecting means including a rotary member operatively connected with said tool holder for indexing the same between said positions; and second drive means including a hydraulic motor for rotating said rotary member, for moving said second connecting means at such a speed that said second connecting means reciprocates said carriage means toward and away from the workpiece at a higher speed than said working speed, and for placing said bars of said first and second connecting means in said aligned connecting condition, said second drive means rotating said rotary member to index said tool holder from each working position to the next following working position during a reciprocating movement of said carriage means.

5. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means; first and second interconnected connecting means respectively connected to said first drive means and to said carriage means, said first and second connecting means being movable relative to each other and having a connecting condition connecting said first drive means with said carriage means so that said first drive means drives said carriage means at a working speed through said first and second connecting means in said connecting condition, said second connecting means including a rotary member, and a shaft mounted for turning movement on said carriage and rotatably supporting said rotary member; a selectively operable clutch having means connecting said rotary member with said shaft for turning movement in at least one direction of rotation, said shaft being operatively connected with said tool holder for indexing the same between said working positions; and second drive means including a hydraulic motor for rotating said rotary member, for moving said second connecting means at such a speed that said second connecting means reciprocates said carriage means toward and away from the workpiece at a higher speed than said working speed, and for placing said first and second connecting means in said connecting condition, said second drive means rotating said rotary member to index said tool holder from each working position to the next following working position during a reciprocating movement of said carriage means.

6. In an auntomatic machine tool, in combination, carriage means mounted for reciprocating movement; a tool holder mounted on said carriage means for indexing movement between a plurality of working positions, and for reciprocating movement with said carriage means toward and away from a workpiece; first drive means; first and second interconnected connecting means respectively connected to said first drive means and to said carriage means, said first and second connecting means being movable relative to each other and having a connecting condition connecting said first drive means with said carriage means so that said first drive means drives said carriage means at a working speed through said first and second connecting means in said connecting condition, said second connecting means including a shaft mounted for turning movement on said carriage means, a rotary member supported on said shaft, means for connecting said rotary member with said shaft for rotation in at least one direction, a crank arm carried by said shaft, and said first connecting means including a connecting rod pivotally connected with said crank arm, said crank arm and said connecting rod being aligned in the direction of the carriage movement in said connecting condition, said shaft being operatively connected with said tool holder for indexing the same between said working positions; and second drive means including a hydraulic motor for rotating said rotary member, for moving said second connecting means at such a speed that said second connecting means reciprocates said carriage means toward and away from the workpiece at a higher speed than said working speed, and for placing said first and second connecting means in said connecting condition, said second drive means rotating said rotary member to index said tool holder from each working position to the next following working position during a reciprocating movement of said carriage means.

7. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means including a rotary cam means, and rotary cam follower means; first and second interconnected connecting means respectively connected to said cam follower means and to said carriage means, said first and second connecting means being movable relative to each other and having a connecting condition connecting said first drive means with said carriage means so that said first drive means drives said carriage means at a working speed through said first and second connecting means in said connecting condition, said second connecting means including a shaft mounted for rotary movement on said carriage means, a rotary member supported on said shaft, means for connecting said rotary member with said shaft for rotation in at least one direction, a crank arm carried by said shaft, and said first connecting means including a connecting rod pivotally connected with said crank arm, said crank arm and said connecting rod being aligned in the direction of the carriage movement in said connecting condition, said shaft being operatively connected with said tool holder for indexing the same between said working positions; and second hydraulic drive means including cylinder and piston means, and means driven by the same for rotating said rotary member, for moving said second connecting means at such a speed that said second connecting means reciprocates said carriage means toward and away from the workpiece at a higher speed than said working speed, and for placing said first and second connecting means in said connecting condition, said second drive means rotating said rotary member to index said tool holder from each working position to the next following working position during a reciprocating movement of said carriage means.

8. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means including rotary cam means and rotary cam follower means; a stop means on said carriage means for blocking turning movement of said cam follower means in one direction of rotation; first and second interconnected connecting means respectively connected to said cam follower means and to said carrige means, said first and second connecting means being movable relative to each other and having a connecting condition connecting said first drive means with said carriage means so that said first drive means drives said carriage means in said connecting condition, said second connecting means including a shaft mounted for turning movement on said carriage means, a rotary member supported on said shaft, means for connecting said rotary member with said shaft for rotation in at least one direction, a crank arm carried by said shaft, and said first connecting means including a connecting rod pivotally connected with said crank arm, said crank arm and said connecting rod being aligned in the direction of the carriage movement in said connecting condition, said shaft being operatively connected with said tool holder for turning the same between said working positions, said first connecting means including a connecting member pivotally connected with said connecting rod, said connecting member being connected with said cam follower means and operated by the same to move said carriage means by said crank arm and said connecting rod in said aligned connecting condition; and second hydraulic drive means including cylinder and piston means, and means driven by the same for rotating said rotary member, for moving said second connecting means at such speed that said second connecting means reciprocates said carriage means toward and away from the workpiece at a higher speed than said working speed and for placing said first and second connecting means in said connecting condition, said second drive means rotating said rotary member to index said tool holder from each working position to the next following working position during a reciprocating movement of said carriage means.

9. A machine tool as set forth in claim 8 wherein said connecting member is a rack bar, and said cam follower means includes a toothed segment meshing with said rack bar.

10. In an automatic machine tool, in combination, carriage means mounted for reciprocating movement; a tool holder mounted on said carriage means for indexing movement between a plurality of working positions, and for reciprocating movement with said carriage means toward and away from a workpiece; first drive means, including a rotary cam means, and rotary cam follower means; a stop means on said carriage means for blocking turning movement of said cam follower means in one direction of rotation; first and second interconnected connecting means respectively connected to said cam follower means and to said carriage means, said first and second connecting means being movable relative to each other and having a connecting condition connecting said first drive means with said carriage means so that said first drive means drives said carriage means at a working speed through said first and second connecting means in said connecting condition, said second connecting means including a shaft mounted for rotary movement on said carriage means, a pinion supported on said shaft, means for connecting said pinion with said shaft for rotation in at least one direction, a crank arm carried by said shaft, and said first connected means including a connecting rod pivotally connected with said crank arm, said crank arm and said connecting rod being aligned in the direction of the carriage movement in said connecting condition, means for connecting said shaft with said tool holder for indexing the same between said working positions; said first connecting means including a connecting member pivotally connected with said connecting rod, said connecting member being connected with said cam follower means and operated by the same to move said carriage means by said crank arm and said connecting rod in said aligned connecting condition; and second drive means including a hydraulic motor including a piston secured to said carriage means and a reciprocable cylinder having a rack portion meshing with said pinion for turning the same an angle of 360° while movement of said first connecting means is blocked whereby said carriage means is reciprocated toward and away from the workpiece at a higher speed than said working speed, said pinion having a position in which said crank and connecting rod are aligned whereby said first and second connecting means. are placed in said connecting condition, said rack portion turning said pinion to index said tool holder from each working position to the next following working position during a reciprocating movement of said carriage means.

11. A machine tool as set forth in claim 10 wherein said means for connecting said tool holder with said shaft include a Geneva wheel, and a member secured to said shaft for rotation therewith and having a single projection cooperating with said Geneva wheel.

12. In an automatic machine tool, in combination, carriage means mounted for reciprocating movement; a tool holder mounted on said carriage means for indexing movement between a plurality of working positions, and for reciprocating movement with said carriage means toward and away from a workpiece; a hydraulic motor having a first member secured to said carriage means, and a reciprocable second member having a rack portion; a pinion mounted on said carriage means meshing with said rack portion and means for connecting said pinion with said tool holder for indexing the same between said positions; connecting means connecting said pinion with said carriage means so that the latter is reciprocated during movement of said reciprocable member moving in one reciprocating stroke so that said tool holder is indexed by said pinion from one working position to the next following working position during reciprocation of said carriage means; and drive means connected with said connecting means for moving said carriage means with said tool holder in a working stroke in said working positions of said tool holder.

13. In an automatic machine tool in combination, carriage means mounted for reciprocating movement; a tool holder mounted on said carriage means for indexing movement between a plurality of working positions, and for reciprocating movement with said carriage means toward and away from a workpiece; a hydraulic motor having a piston member secured to said carriage means, and a reciprocable cylinder member having a rack portion; a pinion meshing with said rack portion, a shaft mounted on said carriage means supporting said pinion for rotary movement, means for connecting said shaft with said tool holder for indexing the same between said positions; and connecting means for connecting said pinion with said shaft for rotation in at least one direction, said connecting means causing reciprocation of said carriage means during movement of said reciprocable member moving in one reciprocating stroke so that said tool holder is indexed from one working position to the next following working position during reciprocation of said carriage means.

References Cited by the Examiner

UNITED STATES PATENTS

| | | | |
|---|---|---|---|
| 2,039,347 | 5/1936 | Rich | 29—44 |
| 2,322,525 | 6/1943 | Kuehn | 29—46 X |
| 2,952,168 | 9/1960 | Leifer | 29—46 |
| 3,024,520 | 3/1962 | Pulman | 29—44 |
| 3,116,537 | 1/1964 | Boner | 29—44 |

FOREIGN PATENTS 699,814  11/1953  Great Britain.

WILLIAM W. DYER, JR., *Primary Examiner.*

L. VLACHOS, *Assistant Examiner.*